Figure 7:
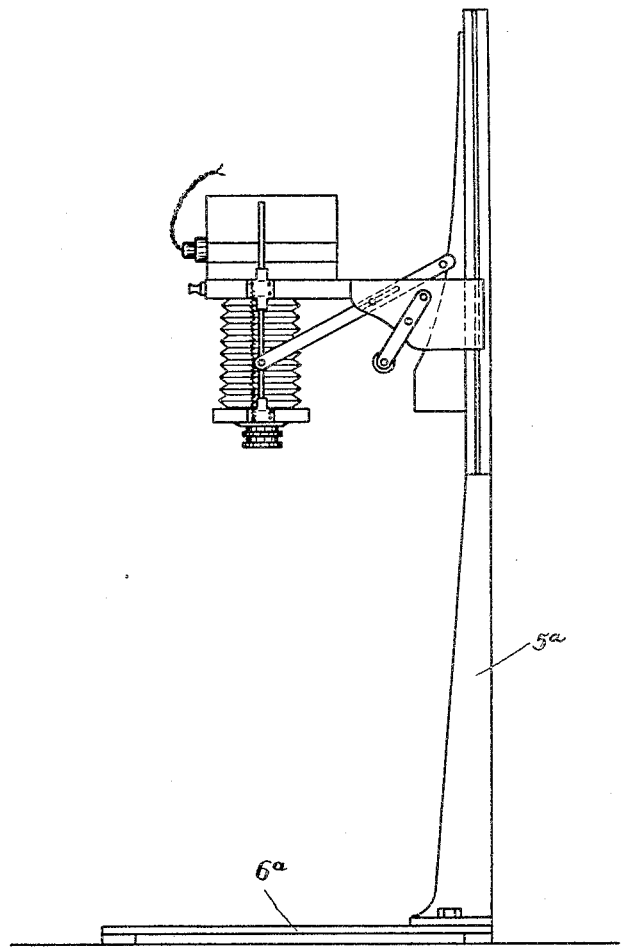

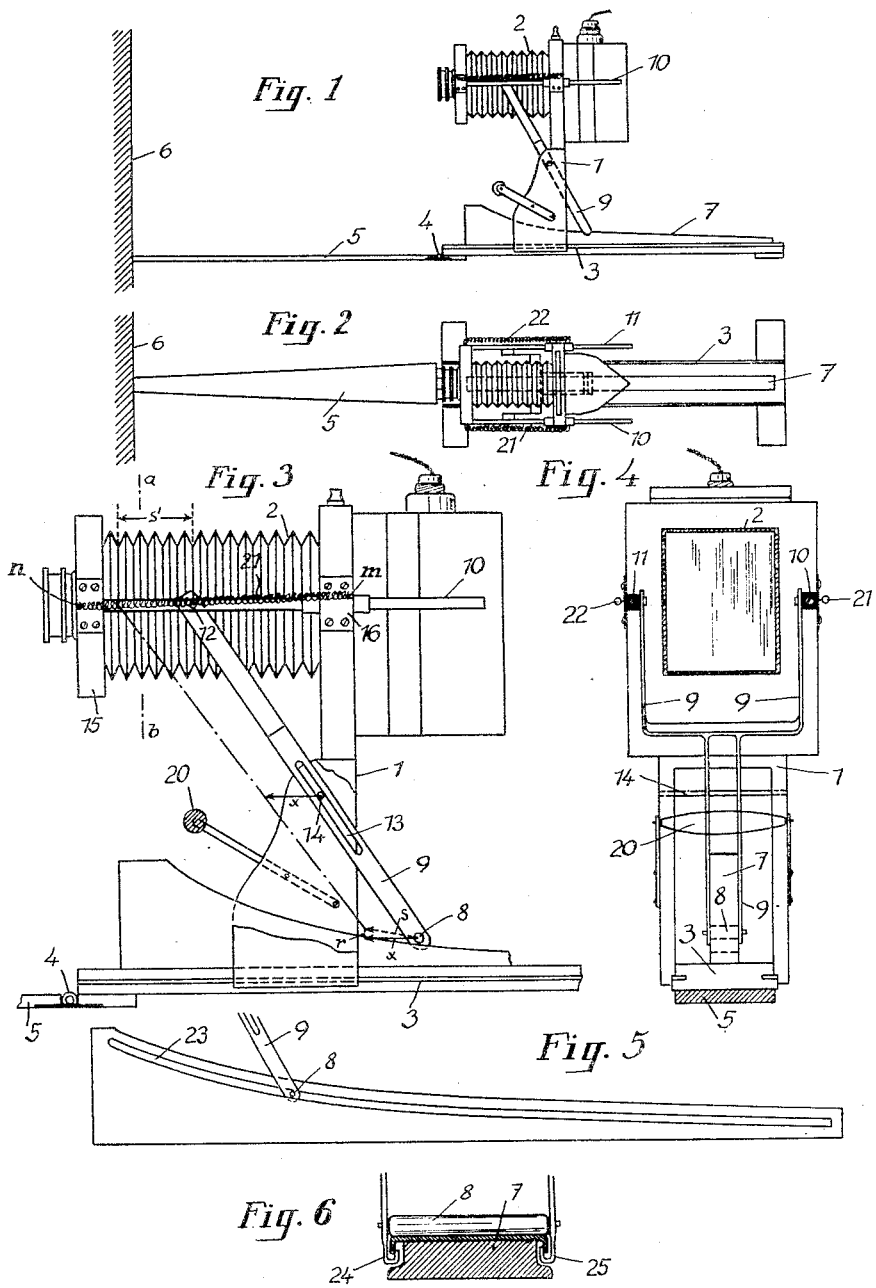

Feb. 24, 1931.   A. KONIECZNY   1,793,623
MAGNIFYING APPARATUS
Filed July 5, 1928   2 Sheets-Sheet 2

Patented Feb. 24, 1931

1,793,623

UNITED STATES PATENT OFFICE

ANTON KONIECZNY, OF VIENNA, AUSTRIA

MAGNIFYING APPARATUS

Application filed July 5, 1928, Serial No. 290,642, and in Germany July 7, 1927.

This invention relates to improvements in enlarging cameras provided with an automatic focusing device. The known enlarging cameras with automatic focusing device are constructed in such a manner, that they form an inseparable unit with the projection surface. However cameras of this kind possess the drawback, that they are very bulky and heavy in weight and further take up a great deal of space. According to the present invention an enlarging camera is provided in which the automatic focusing of the objective carrier is effected by a lever controlled by a guide curve and comprises in combination a member hinged to the camera support for determining the distance of the latter from a projection surface which is separate from the camera and a double-armed control lever which cooperates at one end with the guide curve and at the other end with the movable part of the objective carrier.

The drawings show two embodiments of the invention.

Fig. 1 shows the mechanism in side elevation, Fig. 2 in plan view. Fig. 3 shows the device in side elevation, partially in section, Fig. 4 shows the mechanism in front, cut along a—b of Fig. 3. Figs. 5 and 6 are showing modifications of some details and Fig. 7 shows another embodiment of the invention.

With 1 there is marked the support of a photographic enlarging apparatus 2, which is leaded in a rail 3. At this rail 3 a distancing-ledge 5 is pivotally mounted by means of a hinge 4, and this ledge 5 determines the distance from the projecting screen. The rail 3 supports besides this a steering-rail 7, whereon there glides a roll 8, which is pivotally mounted in the bifurcated stearing member 9. The steering member 9 is fixed at its other end next 12 by screws with the leading-rods 10, 11, and shows a slit 13, wherein there is situated a bolt 14, fixed in the support 1. The rods 10, 11 are fixed to the objective carrier 15, and they are leaded at 16 in the support.

In order to vary the size of the projected picture in suitable manner, the distance between apparatus and receiving screen is altered. Then follows the focusing in respect of sharpness of the picture by suitable displacement of the bellows.

In the apparatus conforming to the application these two functions are united, as here the sharpness of the picture is automatically focused by means of the displacement of the apparatus. This focusing is derivated from a steering-rail 7, corresponding to the optical fittings of the apparatus.

If the apparatus is drawn forward by using its hand-grasp 20 for instance along a way $x$, then 8 rolls along the steering-rail 7, removing itself thereby as far as $s$ from $x$. The bellows is altered hereby as far as $s'$, the distance $s'$ being transmitted by the steering member 9. The centre 14 of the motion of 9 glides hereby in the slit 13, and in this manner the elevation corresponding to the second partial-way $r$ of $x$ can take place.

If the apparatus is drawn back, the steering member 9 is forced to wander along the steering-rail 7, and thus a lifting-off is avoided, both effects secured by the spiral-springs 21, 22 which are fixed at one end next $m$ at the camera casing, and at their other ends next $n$ at the displaceable part.

A variety with constraint leading is shown in Fig. 5. The steering-member is provided here with a steering-slit 23, wherein there is leaded the roll 8. As Fig. 6 shows, the ends 24, 25 of the bifurcated steering-member are formed here like flaps under grasping the steering-rail 7.

It may be mentioned still, that the usage of a concave steering-curve, and of a straight-line transmitting-lever offers an essential advantage opposite to the already known convex steering-curves actuating an angular lever, this advantage consisting in the possibility to make the steering-curve as long as the guidance provided for the camera. Therefore a much more precise focusing can be reached, than if convexly crooked steering-curves are used, the latter being much shorter and actuating with angular levers the displaceable mechanism.

According to Fig. 7 there is constructed an inflexible rail $5^a$, instead of the flexible rail 5, this inflexible rail $5^a$ being fixed at the receiving-screen $6^a$ by means of screws. The rest of the construction, especially the focusing-mechanism is in total accordance with the embodiment according to Figs. 1-4.

I claim:

1. Photographic enlarging apparatus with a camera support slidably mounted on a guide rail, comprising in combination a steering rail, fixed on the guide rail, a double armed control lever, mounted pivotally and slidably on the said camera support and engaging at one end the steering rail, and connected at the other end with rods fixed to the objective carrier and slidably mounted in bearings of the camera support.

2. Photographic enlarging apparatus with a camera support slidably mounted on a guide rail, comprising in combination a steering rail, fixed on the guide rail, a double armed control lever, mounted pivotally and slidably on the said camera support and engaging at one end the steering rail, and connected at the other end with rods fixed to the objective carrier and slidably mounted in bearings of the camera support, a slit in the middle part of the lever and a bolt fixed in the camera support and engaging the slit of the lever.

3. Photographic enlarging apparatus with a camera support slidably mounted on a guide rail, comprising in combination a member hinged to the camera support for determining the distance of the latter from the projection surface which is separate from the camera, a steering rail, fixed on the guide rail, a double armed control lever, mounted pivotally and slidably on the said camera support and engaging at one end the steering rail, and connected at the other end with rods fixed to the objective carrier and slidably mounted in bearings of the camera support.

In testimony whereof I affix my signature.

ANTON KONIECZNY.